United States Patent [19]

Yokoyama et al.

[11] Patent Number: 4,837,092

[45] Date of Patent: Jun. 6, 1989

[54] MAGNETIC RECORDING POWDER, METHOD OF MANUFACTURING THEREOF AND APPLICATION THEREOF

[75] Inventors: Hirotaka Yokoyama, Yokosuka; Tadashi Ido, Ebina; Tatsumi Maeda; Shunji Kurisu, both of Yokohama, all of Japan

[73] Assignee: Kabushiki Kaisha Toshiba, Kawasaki, Japan

[21] Appl. No.: 84,461

[22] Filed: Aug. 12, 1987

Related U.S. Application Data

[62] Division of Ser. No. 716,120, Mar. 26, 1985, Pat. No. 4,699,771.

[30] Foreign Application Priority Data

May 14, 1984 [JP] Japan ................................... 59-94607
May 14, 1984 [JP] Japan ................................... 59-94608

[51] Int. Cl.$^4$ ...................... C01F 11/46; C01G 49/02; C04B 35/26
[52] U.S. Cl. ................................. 428/694; 252/62.63; 423/138; 423/155; 428/402; 428/900
[58] Field of Search ................ 423/138, 155; 428/402, 428/694, 900; 252/62.63

[56] References Cited

U.S. PATENT DOCUMENTS

| 4,113,641 | 9/1978 | Brona et al. | 252/62.1 P |
| 4,384,012 | 5/1983 | Huisman et al. | 427/130 |
| 4,425,250 | 1/1984 | Hibst | 252/62.59 |
| 4,486,496 | 12/1984 | Dezawa et al. | 428/328 |
| 4,511,617 | 4/1985 | Hideyama et al. | 428/212 |
| 4,522,808 | 11/1985 | Fujiyama et al. | 428/328 |
| 4,565,726 | 1/1986 | Oguchi et al. | 428/328 |
| 4,699,771 | 10/1987 | Yokoyama et al. | 423/138 |

FOREIGN PATENT DOCUMENTS

| 712081 | 6/1965 | Canada . |
| 52210 | 5/1982 | European Pat. Off. . |
| 212623 | 12/1982 | Japan . |
| 2225 | 1/1983 | Japan . |
| 1028133 | 5/1966 | United Kingdom . |

*Primary Examiner*—George F. Lesmes
*Assistant Examiner*—James B. Monroe
*Attorney, Agent, or Firm*—Oblon, Fisher, Spivak, McClelland & Maier

[57] ABSTRACT

A magnetic recording powder comprising a hexagonal barium ferrite substituted with a coercive force control element. This magnetic powder is preliminarily treated with sulfate ion-containing water so as to convert any free barium ions in the magnetic powder to a water insoluble compound such as $BaSO_4$ or $BaS_2O_7$. There is also proposed a magnetic recording medium having a magnetic layer containing such a magnetic powder as mentioned above.

12 Claims, No Drawings

MAGNETIC RECORDING POWDER, METHOD OF MANUFACTURING THEREOF AND APPLICATION THEREOF

This is a division of application Ser. No. 716,120, filed Mar. 26, 1985, now U.S. Pat. No. 4,699,771.

BACKGROUND OF THE INVENTION

I. Field of the Invention:

The present invention relates to a barium ferrite magnetic powder used for a coating type high-density magnetic recording medium, a method of manufacturing thereof, and a high-density magnetic recording medium using the barium ferrite magnetic powder.

II. Description of the Prior Art:

A conventional magnetic recording medium comprises a nonmagnetic support of polyethylene terephthalate, and a magnetic layer containing a fine magnetic powder and a binder as major constituents, formed on the non-magnetic support. A conventional fine magnetic powder comprises needle-like magnetic particles selected from $\gamma$-$Fe_2O_3$, $CrO_2$, Co-$\gamma Fe_2O_3$ and metal Fe. In order to greatly increase the recording density, a strong demand has recnetly arisen for new, fine magnetic powders. Extensive studies have been made for a new magnetic recording medium using a fine hexagonal barium ferrite powder, and a fine hexagonal barium ferrite powder was found to be suitable for high-density recording. The reason why hexagonal barium ferrite powder is used is that this ferrite powder consists of platelet-like particles, and axis of easy magnetization is perpendicular to the platelet planes of the ferrite particles, so that perpendicular orientation can be easily achieved by a magnetic or mechanical orientation process. The fine hexagonal ferrite magnetic powder is mixed with a binder resin and solvent, and then the mixture is coated on a surface of a nonmagnetic tape. The coated layer is placed in a magnetic field so that the surface of the layer is a perpendicular to the direction of the magnetic field, thereby readily aligning the axis of easy magnetization of each fine magnetic particle with the direction of the magnitude field. Thereafter, the layer is dried to obtain a recording medium suitable for perpendicular magnetic recording.

Magnetic recording media have been recently used in a variety of applications. It is accordingly very important to improve reliability such as weather resistance and durability. Particularly, in the case of home video recorders, a relative speed between a reproducing head and a recording medium is about 7 m/sec. Under these conditions, high wear resistance is required for magnetic recording media. Such wear resistance must be obtained in temperatures varying from $-50°$ C. to $80°$ C. with humidity ranging from 0% to 100%, and in seaboard and city atmospheres.

Demand for improved wear resistance in magnetic recording media has increased year by year. Covential barium ferrite magnetic recording media do not always satisfy such a demand.

Since barium ferrite contains barium as its basic element, barium ions which is not caught within barium ferrite particle crystals are possibly present in a barium ferrite fine powder. With a magnetic recording medium using fine barium ferrite particles wherein barium ions are present in an amount exceeding a predetermined amount, a cross-linking hardening of the medium layer is degraded. When this magnetic medium is placed for a long period of time in an atmosphere having a high temperature and a high humidity, barium salt is precipitated on the surface of the medium, thereby degrading recording/reproducing characteristics.

SUMMARY OF THE INVENTION

It is an object of the present invention to solve the conventional problems and to provide a recording medium which has high weather resistance and a low surface kinetic friction coefficient and which is not subject to degradation in characteristics, a magnetic powder suitable for this recording medium, and a method of manufacturing thereof.

According to an aspect of the present invention, there is provided a magnetic recording powder characterized by comprising a hexagonal barium ferrite powder having a coercive force control substituting element, wherein water soluble barium ions in the barium ferrite powder is combined with sulfate ions to consitutute a water insoluble compound.

According to another aspect of the present invention, there is provided a method of manufacturing a magnetic recording powder characterized by comprising the steps of bringing a magnetic powder containing hexagonal barium ferrite with a coercive force control substituting element into contact with water containing sulfate ions, and drying the magnetic powder.

According to still another aspect of the present invention, there is provided a magnetic recording medium having a magnetic layer containing a hexagonal barium ferrite powder with a coercive force control substituting element, the magnetic layer being formed on a substrate, characterized in that a water insoluble compound of barium ions and sulfate ions contained in the magnetic layer.

DETAILED DESCRIPTION OF THE PREFERRED EMBODIMENTS

The present invention is based upon the finding that water insoluble barium salt is the cause of degradation of the weather resistance of a magnetic recording medium using a fine barium ferrite powder. Extensive studies revealed that weather resistance of a recording medium is greatly improved by combining barium ions and sulfate ions to constitute a sulfate compound such as $BaSO_4$ or $BaS_2O_7$.

The magnetic powder according to the present invention is suitable for a coating type high-density magnetic recording medium described in Japanese Patent Disclosure (Kokai) No. 55-86103. This magnetic powder contains a hexagonal barium ferrite powder represented by the general formula $BaO \; n(Fe_{1-x}M_x)_2O_3$, wherein M is an element for controlling a coercive force of barium ferrite and comprises In, Co, Ti, Ni, Mn, Cu, Zn, Ge, Nb, Zr, V, Ta, Al, Cr, Sb or the like or a combination thereof (e.g., Co-Ti, Co-Ge, Co-Ni and Co-Sb). More particularly, a preferable substituting element is Co-Ti. The coercive force of a magnetic recording medium must generally be set in association with a magnetic recording/reproducing head to be used. In order to obtain the best compatibility with Sendust alloy, an amorphous alloy, Permalloy, ferrite or the like, a coercive force of the magnetic powder preferably falls within the range between 200 and 2,000 Oe. In the above general formula, n and x preferably fall within the range of 5.0 to 6.0 and greater than 0 to 0.2, respectively. An average particle size of hexagonal ferrite is preferably selected within the range between 0.01 and 0.3 μm. The average particle size is selected within the above range for the following reason. A sufficient magnetization required for magnetic recording cannot be obtained when the average particle size is less than 0.01 μm. On the other hand, high-density perpendicular magnetic recording cannot be advantageously performed when the average particle size exceeds 0.3 μm.

The method of manufacturing a fine barium ferrite powder according to the present invention is not limited to a particular method but can utilize one of the following methods:

(1) A mixture of a barium ferrite powder component and a glass component such as $BaO$-$b_2O_3$ is melted and then rapidly cooled to obtain a glass mixture. This mixture is heated to precipitate a fine barium ferrite powder, and then the glass component is washed off.

(2) A mixture of a barium ferrite component and a low-melting compound such as barium chloride is heated to precipitate a fine barium ferrite powder, and the low-melting compond is washed off.

(3) A coprecipitate of a barium ferrite precursor material in water at atmospheric pressure or in hightemperature water using an autoclave is washed and baked.

When any one of the above methods is used, it is very important to eliminate ionizable barium outside the magnetic particles in the fine barium ferrite powder. In order to remove the ionizable barium, the fine barium ferrite powder is washed with water. However, it is very difficult to remove ionizable barium to below 0.01% by weight, at which a satisfactory weather resistance of the recording medium is obtained. The present inventors found that when fine barium ferrite powder is washed with water containing a small amount of sulfate ions, the barium ions become water insoluble in the form of barium sulfate or barium pyrosulfate, and the resultant fine barium ferrite powder is suitable for a magnetic recording medium having high weather resistance. When barium sulfate was less than 5% by weight, the recording/reproducing characteristics of the resultant magnetic recording medium were not degraded.

According to the present invention, a barium ferrite powder prepared by any method is brought into contact with water containing sulfate ions for a predetermined period of time and is then separated by a known method. In this case, a time for treating the barium ferrite powder with water containing sulfate ions is arbitrarily determined, but is preferably a period of time (e.g., 10 to 120 minutes) for forming a water insoluble compound of barium ions and sulfate ions. The water temperature is preferably room temperature to 80° C. The above process can be performed in only one step. However, when the process is performed in a plurality of steps, the barium ions can be easily converted to a water insoluble state.

A concentration of sulfate ions in the water is not limited to a particular value, but preferably falls within the range between 5 ppm and 1,000 ppm. When the concentration of sulfate ions is less than 5 ppm, it takes a long period of time to combine barium ions with sulfate ions.

According to the present invention, the barium ferrite powder is treated with water containing sulfate ions and is then dried. However, before drying, the barium ferrite powder is preferably washed with water so as to remove the ionic residue.

A binder resin used in the recording media of the present invention is not limited to any particular material, but can comprise a thermoplastic resin, a thermosetting resin, a reactive resin, or a mixture thereof. The magnetic layer according to the present invention can contain an abrasive material such as aluminum oxide or chromium oxide, and a lubricant such as any fatty acid, ester of fatty acid, silicone oil or fluorcarbon.

The substrate used in the present invention comprises a flexible substrate such as a polyethylene terephthalate substrate, a nonmagnetic metal substrate or the like.

A magnetic recording medium using the magnetic powder according to the present invention can be easily manufactured in accordance with the following general method. 10 to 40 parts by weight of a resin as a binder such as a vinyl chloride-vinyl acetate copolymer, a vinyl chloride-vinylidene chloride copolymer, phenolic resin, or polyurethane resin, about 0.1 to 5 parts by weight of a fatty acid as a dispersion agent, and about 200 parts by weight of a solvent such as methyl ethyl ketone, methyl isobutyl ketone, cyclohexane or alcohol are mixed with 100 parts by weight of a substituted fine hexagonal ferrite particle having an average particle size of 0.01 to 0.3 μm. The resultant mixture is kneaded well by a ball or three-roll mill to prepare a paint or paste magnetic composition. The magnetic composition is coated on a support substrate such as a polyethylene terephthalate substrate and is dried to obtain a magnetic recording medium. In this case, after the magnetic composition is coated on the substrate, it is dried while the magnetic orientation operation is being performed. Alternatively, after the magnetic composition is dried, mechanical rolling is performed to align the C plane (C-axis) of the magnetic particles perpendicular to the substrate surface, thereby obtaining a high-density magnetic recording medium. The fine magnetic particles have a flat structure with a hexagonal C plane. In addition, the axis of easy magnetization is along the C-axis, so that the particles can be easily aligned by magnetic orientation or rolling to be perpendicular to the substrate surface.

I. METHOD OF MANUFACTURING MAGNETIC POWDER FOR MAGNETIC RECORDING

Example 1

1.5 % of an $FeCl_3 \cdot 6H_2O$ aqueous solution containing 126.5 g of Fe ions is mixed with 5 l of a $BaCl_2 2H_2O$ aqueous solution containing 33.6 g of Ba ions, 0.25 l of a $CoCl_2 6H_2O$ aqueous solution containing 1.2 g of Co ions as a substituting element for controlling a coercive force and 0.25 l of a $TiCl_4$ aqueous solution containing 9.8 g of Ti ions. The resultant aqueous solution is added to 3 l of an aqueous solution of 1.2 kg of NaOH under stirring, thereby obtaining a Co,Ti-substituted Ba ferrite precursor. The precursor is washed well with pure water so as to obtain a precursor powder. The thus obtained precursor powder is subjected to crystallization at a temperature of 850° C. for two hours, thereby obtaining a Ba ferrite powder. The Ba ferrite powder had a saturation magnetization of 55 emu/g, a coercive force of 850 Oe and an average particle size of 0.08 μm. An eluded water soluble amoung of Ba ions according to the present invention was 1,300 ppm. In order to remove the eluded water soluble Ba ions, the magnetic powder is washed with water containing 20 ppm of sulfate ions. In this washing method, 1 kg of the magnetic powder was stirred in 20 l of an aqueous solution containing sulfate ions, and after stirring, the solution was left to stand so as to sediment the magnetic powder.

Thereafter, 10 l of a supernatant liquid were poured off. After repeatedly performing this method seven times, the resultant magnetic powder was dehydrated and dried. When the present inventors analyzed an eluded water soluble amount of the resultant magnetic powder, they found it to be 7 ppm. The present inventors also found that a compound of Ba and sulfuric acid was present in the magnetic powder.

Comparative Example 1

The fine barium ferrite powder obtained in the same manner as in Example 1 was subjected to removal of Ba ions in the same manner in Example 1 except for using an aqueous solution without containing sulfate ions. From analysis, the present inventors found that the amount of water soluble Ba ions eluded from the obtained magnetic powder was 105 ppm.

Example 2

A raw material consisting 29.5 mol% of $B_2O_3$, 35.5 mol% of BaO, 26.3 mol% of $Fe_2O_3$, 4.34 mol% of $TiO_2$ and 0.34 mol% of CoO was charged in a crucible having a nozzle at its distal end, and was melted at a temperature of 1,300° C. This melted glass was poured on a double roll with a diameter of 200 mm and was rotated at 2,000 rpm to be quickly cooled, thereby obtaining a vitreous body. The vitreous body was subjected to a heat treatment at a temperature of 800° C. for 10 hours, and the resultant crystalline body was washed in acetic acid solution. Thereafter, in order to remove a vitric component and acetic acid, the crystalline body was washed six times in an aqueous solution in which 20 ppm of sulfate ions were added in pure water in the same manner as in Example 1. When the present inventors analyzed an amount eluted from the magnetic powder, they found it to be 6 ppm. They also found that barium sulfate, as a compound of Ba and sulfuric acid, was present in the magnetic powder. Furthermore, a concentration of this compound was 1.2% by weight.

Comparative Example 2

An aqueous solution containing the magnetic powder obtained in the same manner as in Example 2 was subjected to removal of the vitric component and acetic acid in the same manner as in Example 2 except for using water without containing sulfate ions. The amount of Ba ions eluded from the magnetic powder after washing seven times was 180 ppm. After repeating the same number of washings, the amount of eluded Ba ions was 68 ppm. In comparison with the washing containing sulfate ions, the amount of eluded Ba ions could not be decreased.

Example 3

A Co,Ti-subsituted Ba ferrite precursor was precipitated by the same process as conducted in Example 1. This precursor powder was mixed with NaCl (as a fluxing agent) at a mixing ratio of 1:5 (based on weight). Thereafter, this mixture was heated for one hour at a temperature of 800° C. to precipitate a Co,Ti-substituted barium ferrite powder. Then, in the same manner as in Example 1, 1 kg of the fine barium ferrite powder was washed eight times in water containing 20 ppm of sulfate ions to remove the fluxing agent. As a result, the amount of Ba ions eluded from the magnetic powder was found to be 6 ppm. They also found that the magnetic powder contained 1.0% by weight of a compound of Ba and sulfuric acid as barium sulfate.

Comparative Example 3

A mixture of magnetic powder precipitated in the same manner as in Example 3 and a fluxing agent was washed in the same manner as in the Example 3 except for using water containing no sulfate ion. When the present inventors tested for the amount of Ba ions eluded from the obtained magnetic powder, it was 250 ppm.

From results of Examples 1 to 3 and Comparative Examples 1 to 3, in order to remove Ba ions eluded from the barium ferrite magnetic powder, the present inventors found that water containing sulfate ions was preferably for washing use and that Ba ions become insoluble with sulfate ions.

II. METHOD OF MANUFACTURING MAGNETIC RECORDING MEDIUM

Example 4

By using the fine barium ferrite powder manufactured in Example 1, a material having the following composition was well mixed so as to form a coating material:

| | |
|---|---|
| fine barium ferrite powder | 100 parts by weight |
| vinyl chloride-vinyl acetate copolymer | 10 parts by weight |
| polyurethane | 10 parts by weight |
| fine aluminum oxide powder | 2 parts by weight |
| lubricant | 1.5 parts by weight |
| methyl ethyl ketone (MEK) | 60 parts by weight |
| toluene | 60 parts by weight |
| cyclohexane | 60 parts by weight |

For example, 6 parts by weight of a hardener (e.g., tolylenediisocyanate) were added to the magnetic coating material. The coating material was coated on a polyethylene terephthalate film having a thickness of 15 μm and was smoothed after being dried. After hardening the coating film well, the film was cut to a ½ inch width to manufacture magnetic tape.

When the present inventors examined the solvent resistance of this magnetic tape using MEK, they found it to be good (insoluble). The tape was sufficiently hardened and cross-linked, and has a satisfactory strength. A portion of the magnetic tape manufactured was exposed in an environment at a temperature of 50° C. and a relative humidity of 90% for 170 hours. A surface of the magnetic tape portion subjected to this environmental test was microscopically observed and recording/reproducing characteristics of the video range were examined in comparison with those of the remaining magnetic tape not subjected to the test. It was found that the surface of the magnetic tape was not changed by the environmental test nor were significant changes found in the recording/reproducing characteristics thereof.

Furthermore, observation of a magnetic layer of the magnetic tape using a scanning electron microscope and analysis using an electronic probe microanalyzer revealed that barium sulfate ($BaSo_4$) and barium pyrosulfate ($BaS_2O_7$) were present in the magnetic layer.

Comparative Exmample 4

A magnetic tape of the same coating material composition and processes as in Example 4 was manufactured using the fine barium ferrite powder manufactured in Comparative Example 1.

When the present inventors examined the solvent resistance of the magnetic tape manufactured using MEK, they found that the surface of the coating film was etched by MEK. Next, a portion of the manufactured magnetic tape was exposed in an environment at a temperature of 50° C. and a relative humidity of 90% for 170 hours. The magnetic tape subjected to the environmental test was microscopically observed and the recording/reproducing characteristics of the video range thereof were examined to compare with the remaining magnetic tape not subjected to the test. It was detected that a precipitate not found in the surface of the magnetic tape stored at room temperature was precipitated on the surface of the magnetic tape exposed at a temperature of 50° C. and a humidity of 90%. From analysis using an electronic probe microanalyzer, the present inventors found that the precipitate was barium chloride ($BaCl_2$). They also found that a reproduction output of the magnetic tape exposed at a temperature of 50° C. and humidity of 90% was degraded by about 2 dB in comparison to that stored at room temperature.

Example 5

A magnetic tape of the same coating material composition and processes as in Example 4 was manufactured using the fine barium ferrite powder manufactured in

Example 2.

When the present inventors examined the solvent resistance of this magnetic tape using MEK, they found it to be good. A portion of the magnetic tape manfactured was exposed in an environment at a temperature of 50° C. and a relative humidity of 90% for 170 hours. A surface of the magnetic tape portion subjected to this environmental test was microscopically observed, and recording/reproducing characteristics of the video range were examined to be compared with those of the remaining magnetic tape not subjected to the test. It was fould that the surface of the magnetic tape was not changed by the environmental test nor were significant changes found in the recording/reproducing characteristics thereof.

Furthermore, observation of a magnetic layer of the magnetic tape using a scanning electron microscope and analysis using an electronic probe microanalyzer revealed that barium sulfate ($BaSO_4$) and barium pyrosulfate ($BaS_2O_7$) were present in the magnetic layer.

Comparative Example 5

A magnetic tape of the same coating material composition and processes as in Example 4 was manufactured using the fine barium ferrite powder manufactured in

Example 2.

When the present invention examined the solvent resistance of the magnetic tape using MEK, they found a roughened surface possibly caused by the etching of the solvent. Then, a portion of the magnetic tape was exposed in an environment at a temperature of 50° C. and a relative humidity of 90% for 170 hours. The present inventors microscopically observed the surface of the tape subjected to the environmental test. From this observation, they found a precipitate on the surface of the tape. Analysis of the precipitate proved it to be barium chloride.

Example 6

A magnetic tape of the same coating material composition and processes as in Example 4 was manufactured using the fine barium ferrite powder manufactured in

Example 3.

When the present inventors examined the solvent resistance of this magnetic tape using MEK, they found it to be good. A portion of the magnetic tape manufactured was exposed in an environment at a temperature of 50° C. and a relative humidity of 90% for 170 hours. A surface of the magnetic tape portion subjected to this environmental test was microscopically observed and recording/reproducing characteristics of the video range were examined to be compared with those of the remaining mangetic tape not subjected to the test. It was found that the surface of the magnetic tape was not changed by the environmental test and, in addition, significant changes in the recording/reproducing characteristics thereof were not found.

Furthermore, from observation of a magnetic layer of the magnetic tape using a scanning electronic microscope and by analysis using an electronic probe microanalyzer, it was found that barium sulfate ($BaSO_4$) and barium pyrosulfate ($BaS_2O_7$) were present in the magnetic layer.

Comparative Example 6

The magnetic tape of the same coating material composition and processes as in Example 6 was manufactured using the fine barium ferrite powder manufactured in

Example 3.

When the present inventors examined the solvent resistance of this magnetic tape using MEK, they found it to be good.

Next, a portion of the manufactured magnetic tape was exposed in an environment at a temperature of 50° C. and a relative humidity of 90% for 170 hours. The magnetic tape subjected to the environmental test was microscopically observed and the recording/reproducing characteristics of the video range thereof were examined to be compared with the remaining magnetic tape not subjected to the test. As a result of these examinations, it was detected that a precipitate not found in the surface of the magnetic tape stored at room temperature was precipitated on the surface of the magnetic tape exposed at a temperature of 50° C. and a humidity of 90%. From analysis using an electronic probe microanalyzer, the present inventors found that the precipitate was barium chloride ($BaCl_2$). They also found that a reproduction output of the magnetic tape exposed at a temperature of 50° C. and a humidity of 90% was degraded by about 2 dB in comparison to that stored at room temperature.

As apparent from Examples 4 to 6 and Comparative Examples 4 to 6, a magnetic recording medium in which Ba ions outside the magnetic particles are present in a form insoluble by a sulfate acid group is sufficiently subjected to the hardening reaction, thus cross-linking a resin. For this reason, the magnetic layer is strong and weather resistance is improved.

Kinetic friction coefficients of the tapes manufactured in Examples 4 to 6 and in Comparative Examples 4 to 6 were measured and compared with each other. The results are shown in Table 1 below.

TABLE 1

Measurement of Kinetic Friction Coefficient

| Tape | Example 4 | Comparative Example 4 | Example 5 | Comparative Example 5 | Example 6 | Comparative Example 6 |
|---|---|---|---|---|---|---|
| Kinetic Friction Coefficient | 0.26 | 0.32 | 0.25 | 0.35 | 0.20 | 0.30 |

From Table 1, the friction coefficient of each tape acording to the Examples is lower than that of the Comparative Examples.

As described above, according to the present invention, there is provided a strong magnetic recording medium having a good weather resistance, a small kinetic friction coefficient and a high practical value. Although the present invention is described with reference to the magnetic tape, the present invention can be applied to other magnetic recording media such as a flexible disc to obtain the same effect.

What is claimed is:

1. A magnetic recording powder comprising a hexagonal barium ferrite powder having a coercive force control substituting element, wherein free barium ions in said barium ferrite powder are combined with sulfate ions to constitute a water insoluble compound in said magnetic powder, wherein said hexagonal barium ferrite powder having said coercive force control substituting element is represented by the formula:

$$BaO \cdot n(Fe_{1-x}M_x)_2O_3$$

wherein M is at least one member selected from the group consisting of indium, cobalt, titanium, nickel, manganese, copper, zirconium, niobium, vanadium, tantalum, zinc, chromium, aluminum, germanium and antimony, x is greater than 0 to 0.2, and n is 5.0 to 6.0.

2. The magnetic powder according to claim 1, wherein said hexagonal barium ferrite powder has an average particle size falling within a range between 0.01 μm and 0.3 μm.

3. The powder according to claim 1, wherein said hexagonal barium ferrite powder has a coercive force falling within a range between 200 oersteds and 2,000 oersteds.

4. The powder according to claim 1, wherein said water insoluble compound is contained in an amount of not more than 5% by weight with respect to a total weight of said magnetic powder.

5. The powder according to claim 1, which contains therein less than 0.01% by weight of watersoluble barium ions.

6. The powder according to claim 5, which contains therein less than or equal to 7 ppm of watersoluble barium ions.

7. A magnetic recording medium having a magnetic layer containing a hexagonal barium ferrite powder with a coercive force control substituting element, said magnetic layer being formed on a substrate, wherein a water insoluble compound of barium ions and sulfate ions is contained in a magnetic layer, wherein said hexagonal barium ferrite powder having said coercive force control subsituting element is represented by the formula:

$$BaO \cdot n(Fe_{1-x}M_x)_2O_3$$

wherein M is at least one member selected from the group consisting of indium, cobalt, titanium, nickel, manganese, copper, zirconium, niobium, vanadium, tantalum, zinc, chromium aluminum, germanium and antimony, x is greater than 0 to 0.2, and n is 5.0 to 6.0.

8. The recording medium according to claim 7, wherein said hexagonal barium ferrite powder has an average particle size falling within a range between 0.01 μm and 0.3 μm.

9. The recording medium according to claim 7, wherein said hexagonal barium ferrite powder has a coercive force falling within a range between 200 oersteds and 2,000 oersteds.

10. The recording medium according to claim 7, wherein said water-insoluble compound is contained in an amount of not more than 5% by weight with respect to a total weight of said magnetic powder.

11. The magnetic recording medium according to claim 7, wherein said magnetic powder contains less than 0.01% by weight of water-soluble barium ions.

12. The magnetic recording medium according to claim 11, wherein said magnetic powder contains less than or equal to 7 ppm of water-soluble barium ions.

* * * * *